US007051019B1

(12) United States Patent
Land et al.

(10) Patent No.: US 7,051,019 B1
(45) Date of Patent: May 23, 2006

(54) METHOD AND SYSTEM FOR OBTAINING IMAGES FROM A DATABASE HAVING IMAGES THAT ARE RELEVANT TO INDICATED TEXT

(75) Inventors: Stephen D. Land, Seattle, WA (US); Debra L. Linker, Issaquah, WA (US); Roland C. Lindsey, Renton, WA (US); Curtis M. Stratmeyer, Bellevue, WA (US); Michael D. Craig, Seattle, WA (US)

(73) Assignee: Corbis Corporation, Seattle, WA (US)

( * ) Notice: Subject to any disclaimer, the term of this patent is extended or adjusted under 35 U.S.C. 154(b) by 0 days.

(21) Appl. No.: 09/376,748

(22) Filed: Aug. 17, 1999

(51) Int. Cl.
*G06F 17/30* (2006.01)

(52) U.S. Cl. .......................... 707/4; 707/5; 707/104.1; 715/515; 715/516

(58) Field of Classification Search ................ 707/104, 707/515, 3–6, 516, 500
See application file for complete search history.

(56) References Cited

U.S. PATENT DOCUMENTS

| | | | |
|---|---|---|---|
| 5,317,508 A | | 5/1994 | Okamoto et al. |
| 5,404,435 A | * | 4/1995 | Rosenbaum ................ 707/515 |
| 5,493,677 A | * | 2/1996 | Balogh et al. ............... 707/104 |
| 5,761,655 A | * | 6/1998 | Hoffman ........................ 707/4 |
| 5,893,101 A | * | 4/1999 | Balogh et al. ............... 707/100 |
| 6,021,412 A | * | 2/2000 | Ho et al. ..................... 707/104 |
| 6,094,649 A | * | 7/2000 | Bowen et al. .................. 707/3 |
| 6,108,674 A | * | 8/2000 | Murakami et al. ........... 715/515 |

FOREIGN PATENT DOCUMENTS

EP 0 657 828 A1 6/1995

OTHER PUBLICATIONS

Baru et al. "XML based Information for Ditital Libraries", Proceedings of the fourth ACM conference on Digital libraries, Aug. 11-14, 1999. Berkeley, CA USA, pp. 215-215.*

(Continued)

*Primary Examiner*—Khanh B. Pham
(74) *Attorney, Agent, or Firm*—Darby& Darby PC; Jamie L. Wiegand (57) ABSTRACT

A method and system for using indicated text to automatically query a search engine for a database and return images that are relevant to the indicated text. At least five integrated components are employed by a client program to get, view and use a returned image. A user interface component provides for automatically creating search criteria for a query from the indicated text and inserting a thumbnail or higher quality image into an open document. A metadata results component provides for managing the storing, parsing and displaying of the metadata results returned from a query of the database of images. A navigation component provides for managing user interface navigation elements that are employed to control the display of the results (thumbnail images) of the query, e.g., play, stop, back and next controls. An image binary data component provides for managing the display of returned images and managing the storage of the binary image data for the thumbnail and higher quality images. Also, a network component provides for detecting the presence of a network and its settings and managing the transfer of data across the network such as the Internet and an intranet. Additionally, a qualification engine may be used to determine the context of the indicated text. An electronic commerce service may be used to purchase higher quality versions (improved resolution and/or color) of the thumbnail images.

53 Claims, 8 Drawing Sheets

OTHER PUBLICATIONS

Lycos Internet Home Page, "Lycos SeeMore," http://www.lycos.com/seemore/Install.html, Aug. 17, 1999.

M. Ginty, "Lycos Looks to Broaden Reach With New Search," InternetNews.Com, Sep. 16, 1999.

* cited by examiner

METHOD AND SYSTEM FOR OBTAINING IMAGES FROM A DATABASE HAVING IMAGES THAT ARE RELEVANT TO INDICATED TEXT

FIELD OF THE INVENTION

This application relates generally to obtaining images from a database, and, more specifically, to returning chosen images from the database that are relevant to indicated text in a document.

BACKGROUND OF THE INVENTION

In the past, when a user of an application program wished to add an image to a file created by that application, the user manually searched a database of images or surveyed a relatively large group of images organized into predetermined categories. Alternatively, the user might be required to pre-purchase access to a database of images prior to searching for an image relevant to the content of the document. In either case, the user would be required to indicate the relevant image by manually comparing a set of preselected images to the content of a document.

Therefore, it is desirable to provide a simple and intuitive facility for enabling a user to choose an image relevant to the content of a document. The facility could be a stand alone application program or integrated with an existing application program, e.g., a word processor, slide show presentation or email program. It is also desirable to provide a facility that enables the user to purchase a chosen image and indicate the quality and options associated with the purchased image. Also, the facility should enable the purchased image to be viewed and printed with any widely available application program.

SUMMARY OF THE INVENTION

In accordance with the present invention, a method for searching a database to obtain an object that is related to an indicated object, comprising: (1) automatically creating a query related to the indicated object, the query having a data structure that is recognizable by a search engine for the database; (2) providing the query to the search engine, the search engine searching the database for at least one object that is related to the indicated text; (3) returning the result from the query of the database, the result indicating when at least one object is related to the indicated text; and (4) producing a display of a related object, so that the related object may be associated with the indicated object. The indicated object and the related object may include data such as video, picture, sound, and text. Also, a qualification engine may be used to determine a context of the indicated object. The query for the database can be automatically created based on the context of the indicated object. Additionally, the related object may be purchased over a network. When complete financial information provided over a network to an electronic commerce service, the service can enable the purchase of the related object.

In accordance with another embodiment of the present invention, a method provides for obtaining an image from a database for insertion into a document, the image being related to indicated text, comprising: (1) enabling an automatic creation of a query related to the indicated text, the query having a data structure that is recognizable by a search engine for the database; (2) providing the query to the search engine, the search engine searching the database for an image that is related to the indicated text; (3) returning the result from the query of the database, the result indicating when at least one image is related to the indicated text; (4) enabling the display of at least one image indicated by the result from the query, a displayed image being selectable for insertion into the document; and (5) displaying a related image that is inserted into the document, so that the related image is associated with the indicated text in the document.

In accordance with other aspects of the other embodiment of the present invention, the method provides for employing a user interface component to automatically create the query for the database, the creation of the query being related to the indicated text. The user interface component enables the indicated text to be edited and chosen in the document. The indicated text may be chosen from within an application program that provides the document. A command can be chosen to create the query for the indicated text, the command may include a selection in a context menu, drop-down menu, pop-up window, dialogue box, toolbar and hot key. The indicated text may be chosen in another application program, e.g., a clipboard program, that is separate from the application program that provides the document.

In accordance with yet other aspects of the other embodiment of the present invention, the method provides for enabling a qualification engine to determine a context of the indicated text within the document. The context of the indicated text may be employed by the user interface component to automatically create the query for the database. The determined context of the indicated text may include text, template, sound, video, picture, use and user preference.

In accordance with still other aspects of the other embodiment of the present invention, the search engine may be a local search engine that employs the query to search for related images on a local drive that includes the database. The local drive may include a hard disk, floppy disk, tape drive, DVD and CD-ROM. The query of the database may include an XML data structure. Also, a network component may be employed to communicate with the search engine over a network that can include an intranet and the Internet. Additionally, a result component may be employed to manage the result of the query returned by the search engine, the result component enabling the parsing, storing and display of the result of the query. The result may be provided in a metadata format.

In accordance with other aspects of the other embodiment of the present invention, the method provides for requesting at least one related image from the database that is indicated by the result of the query, the related image being provided as binary image data. An image component may be provided to manage the storage and display of binary image data.

In accordance with yet other aspects of the other embodiment of the present invention, a navigation component may be employed to provide a control for displaying at least one related image. The navigation component enables a slide show display of a group of related images that are indicated in the result from the query. The navigation component enables the slide show to display other groups of related images that are indicated in the result from the query. The navigation component may include a control for determining a period of time that each related image is displayed in the slide show. Also, the navigation component can include a control for indicating the number of the related image in the group that is currently displayed in the slide show. Additionally, the navigation component may include a control for indicating each group of related images that are currently displayed in the slide show.

In accordance with yet other aspects of the other embodiment of the present invention, a help facility may be launched in response to an input and provide an explanation of a chosen topic. Also, a thumbnail of the related image may be displayed. Additionally, a digital watermark may be included with the related image which provides information related to the content of the related image. Furthermore, the query can include a cookie that may provide information related to a user.

In accordance with other aspects of the other embodiment of the present invention, the method provides for: (1) indicating a higher quality image of the related image is to be purchased over a network; (2) providing financial information to an electronic commerce service over the network, the electronic commerce service enabling the purchase of the higher quality image when the financial information is complete; and (3) inserting the purchased higher quality image into the document so that the higher quality image is displayed with the indicated text. An electronic shopping cart may be employed to store a potential purchase of the higher quality image. A parameter and use of the higher quality image may be indicated.

In accordance with yet other aspects of the other embodiment of the present invention, each time indicated text is employed to create the query, the method may automatically save the indicated text as an entry in a history file and enable at least one of the entries in the history file to be chosen for the currently indicated text. Also, a URL may be embedded in the related image pasted into the document. The URL can provide a link to information associated with the related image. Additionally, the method can automatically connect to the search engine for the database when the search engine is remotely located from the indicated text. Also, when no indicated text is provided, a word that is closest to a cursor may be determined and employed as the indicated text.

In accordance with another embodiment of the present invention, a method for electronically purchasing an image over a network, comprising: (1) automatically creating a query related to an indicated object, the query having a data structure that is recognizable by a search engine for the database; (2) providing the query to the search engine, the search engine searching the database for at least one image that is related to the indicated object; (3) returning the result from the query of the database, the result indicating when at least one image is related to the indicated object; (4) indicating a related image is to be purchased over the network, financial information being provided to an electronic commerce service that enables the purchase of the related image when the financial information is complete; and (5) when the related image is purchased, enabling a display of the related image, so that the related image may be associated with the indicated object.

In accordance with other additional aspects of the present invention, a system which implements substantially the same functionality in substantially the same manner as the methods described above is provided.

In accordance with yet other additional aspects of this invention, a computer-readable medium that includes computer-executable instructions may be used to perform substantially the same methods as those described above is provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention enables a user to choose an image from a group of images that are determined to be the most relevant for indicated text. The present invention uses indicated text to find relevant images by automatically generating a query based on the indicated text for a database of images and displaying the query results as thumbnail images in a slide show. The user may insert any of the thumbnail images into a document or purchase a higher quality version of an indicated thumbnail image for use in the document. An electronic shopping cart may be provided for temporarily storing several higher quality images that may be purchased individually or as a group at a later date.

It is envisioned that the functionality of the present invention may be provided in different ways, including a stand-alone application program and an add on (extension) facility incorporated into an application program. For example, the present invention may be implemented as an executable file (EXE), as a Visual Basic control (VBX) or as a dynamic linked library (DLL). Also, the application programs that work with the present invention may include email, spreadsheet, word processor, slide show presentation, browser and editor.

Graphical User Interface

Figure 1:
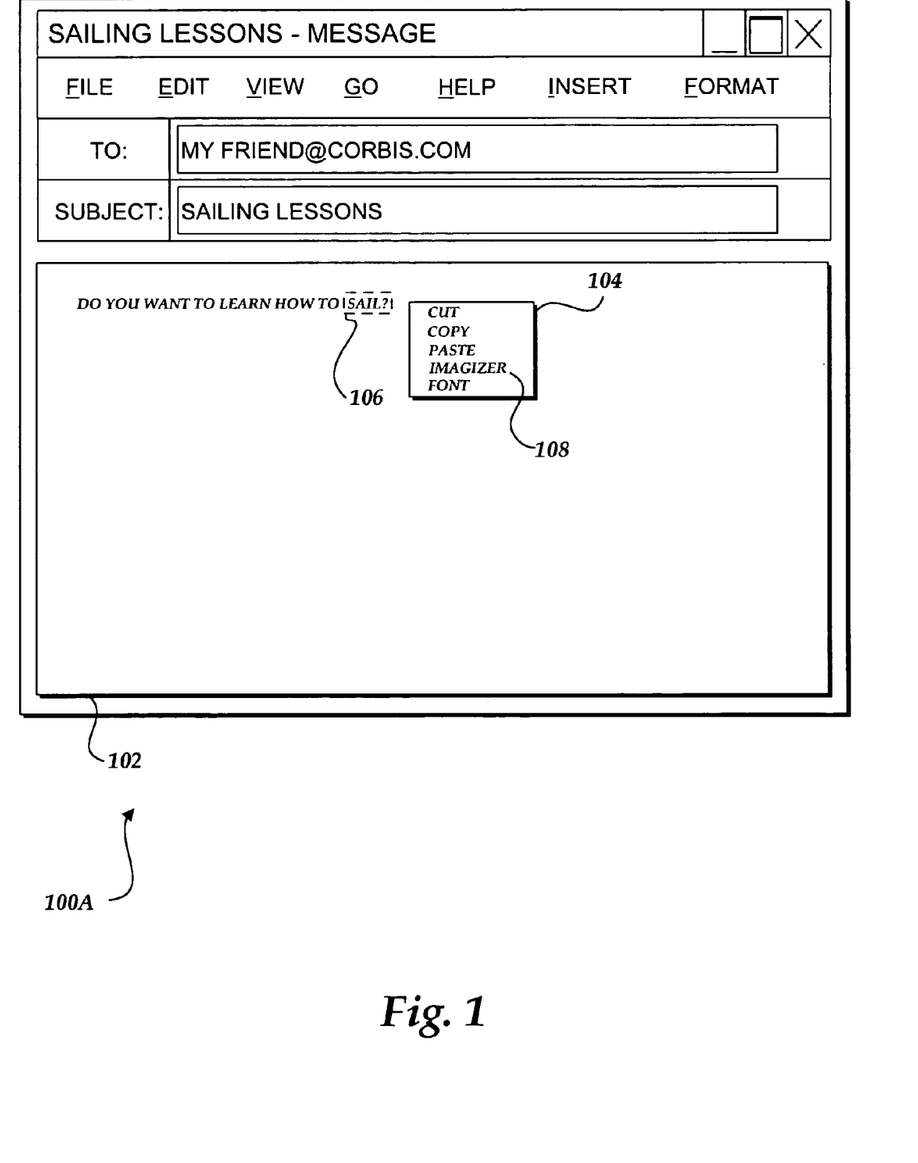
FIG. 1 illustrates indicated text and a context menu in a document displayed in a graphical user interface for an exemplary email program.

FIG. 1 illustrates an exemplary graphical window 100A for an email application program that incorporates an Imagizer facility for implementing the functionality of the present invention. The Imagizer facility may be integrated into the email application program in several ways, including a DLL or a separate add on program.

Figure 2:
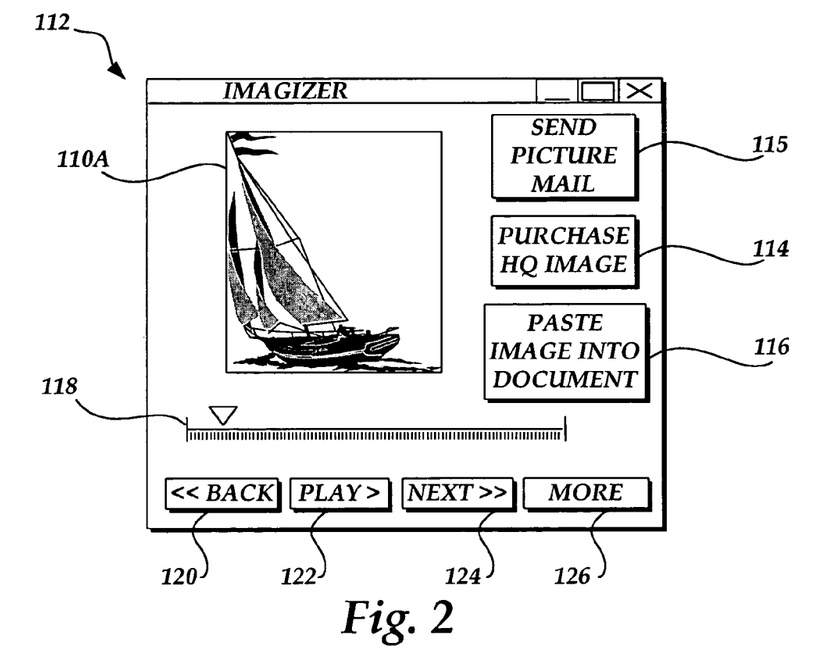
FIG. 2 shows an exemplary pop-up window for an Imagizer program.

In a document window 102, the sentence (string) "Do you want to learn how to sail" is positioned in the upper left hand corner. The word "sail" 106 is highlighted (indicated) in the sentence and a context menu 104 is disposed adjacent to the indicated word. Alternatively, the context menu 104 may be disposed adjacent to a cursor. However, in this example, the context menu 104 for the word "sail" 106 is displayed when a button on a user interface pointing device, e.g., a mouse, is selected. The context menu 104 lists several commands including cut, paste, font and imagizer. When an imagizer command 108 is selected, a pop-up window 112 entitled "imagizer" is displayed by the Imagizer facility, as shown in FIG. 2. Although not shown, it is envisioned that the imagizer command may be selected as an element on a toolbar and as a menu item in a drop-down menu. Additionally, when no text is indicated, the Imagizer facility may determine the nearest word to the cursor and employ that word as the indicated text for searching the database of images.

In FIG. 2, the pop-up window 112 illustrates a thumbnail image 110A of a sailboat. The thumbnail image 110A is disposed in the upper portion of the pop-up window 112 and the thumbnail image is the currently displayed image in a slide show for a group of images relevant to the indicated word "sail" 106. A slide control 118 is disposed in the lower portion of the pop-up window 112 and the control is animated to graphically illustrate the progressive display of each thumbnail image in the slide show. Additionally, the slide control 118 may be selected to cause the slide show to move to the display of a particular thumbnail image. A button 114, entitled "Purchase HQ Image," is displayed adjacent to the thumbnail image 110A in the upper right hand portion of the pop-up window 112. As described in greater detail below, the selection of the button 114 causes an electronic commerce transaction to be initiated for the purchase of a higher quality (higher resolution) version of an indicated thumbnail image.

Another button 116, entitled "Paste Image Into Document," is displayed adjacent to the thumbnail image 110A in the upper right hand portion of the pop-up window 112 and directly below the button 114. As described in greater detail below, the selection of the button 116 causes an indicated image, e.g., a currently displayed thumbnail image or a purchased higher quality version, to be pasted into the document adjacent to the indicated word "sail" 106.

A button 115, entitled "Send Picture Mail," is displayed adjacent to the thumbnail image 110A in the uppermost right hand portion of the pop-up window 112, directly above button 114. The selection of the button 115 causes an email facility to create and send an email message that includes the indicated image from within the Imagizer facility. Although not shown, the email facility enables the user to enter an email destination and text to accompany the indicated image.

Another button 120, entitled "<<Back," is displayed in the lower left quarter of the pop-up window 112 and below the slider control 118. Directly to the right of the button 120, another button 122, entitled "Play," is disposed and a button 124, entitled "Next>>," is positioned to the right of the button 122. The three button 120, 122 and 124 enable a user to navigate the slide show by selectively controlling the play, advance and replay of the thumbnail images. A button 126, entitled "More," is displayed to the right of the button 124 ("Next>") and the selection of the button 126 causes another pop-up window 128, entitled "More," to be displayed, as shown in FIG. 3.

Although not shown, it is envisioned that the functionality of the "<<Back" button 120 and the "Next>>" button 124 may be incorporated into a horizontal scrollbar that includes a pointer. The horizontal scrollbar could include separate buttons disposed at opposing ends of the scrollbar and the selection of a button would enable a forward or backward navigation of the group of thumbnail images. Also, the pointer might move along the scrollbar as each thumbnail image in the group is sequentially displayed. By selecting the position of the pointer on the scrollbar, the user could navigate through the group of thumbnail images.

Figure 3:
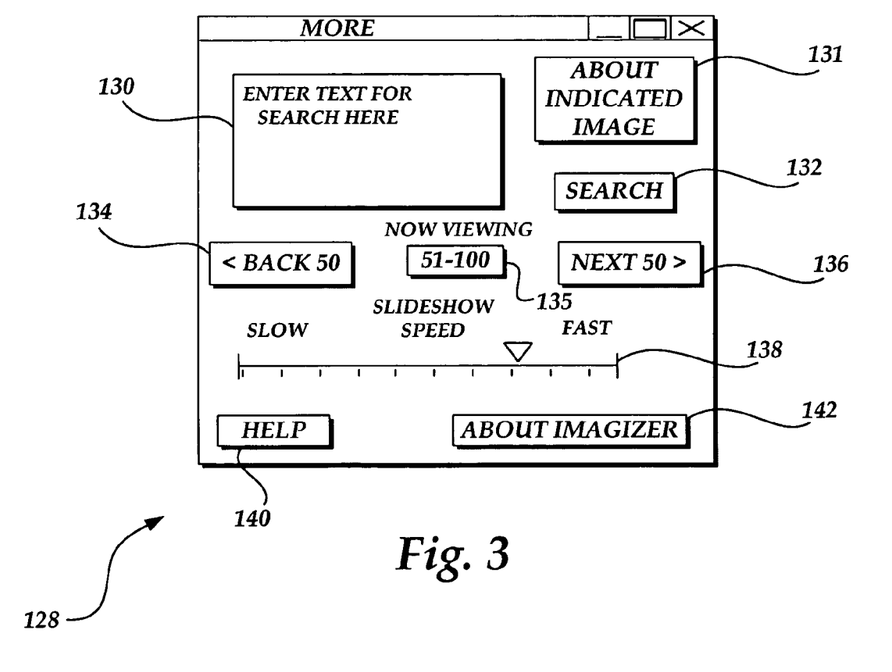
FIG. 3 illustrates an exemplary pop-up window for options associated with the Imagizer program.

FIG. 3 shows the "More" pop-up window 128 with a text entry box 130 positioned in the upper left hand quarter of the pop-up window. A button 132, entitled "Search," is disposed adjacent to the right hand side of the text entry box 130. When text is entered in the box 130 and the search button 132 is selected, this action causes a database to be searched for images relevant to the entered text, which is discussed in greater detail below. Also, a group of relevant images returned from the database are displayed in a slide show, as shown in the pop-up window 112 in FIG. 2.

A button 134, entitled "<Back 50," is positioned directly below the text box 130 in the bottom left hand of the pop-up window 128 and another button 136, entitled "Next 50>," is positioned directly below the search button 132 in the bottom right hand of the pop-up window. Also, a view box 135, entitled "Now Viewing", is positioned horizontally between the buttons 134 and 136, which displays reference numbers for the group of relevant thumbnail images that are currently displayed in the slide show.

The slide show displayed in pop-up window 112 uses a predetermined number (group) of thumbnail images that are relevant to the indicated/entered text. However, the present invention enables more than one group of relevant images to be viewed in the slide show by using the buttons 134 and 136 to navigate the display of different groups of images. When the "<Back 50" button 134 is selected, this action will cause a previously displayed group of fifty relevant thumbnail images to be used in the slide show. Similarly, when the "Next 50>" button 136 is selected, the next group of fifty relevant thumbnail images will be displayed in the slide show.

Alternatively, a seamless slide show display (no 50 image pagination) of the entire group of thumbnail images may be provided. In this case, the buttons 134 and 136 would not be provided in the "More" pop-up window 128.

A slide control 138 is disposed in the bottom portion of the pop-up window 128. The manipulation of the slider control 138 will cause an increase or decrease in the amount of time each thumbnail image is displayed in the slide show. Also, a button 140, entitled "help," is disposed below the slide control 138 in the lower left hand of the pop-up window 128. The selection of the help button 140 causes a help facility to display information regarding a chosen topic in an index. Another button 142, entitled "About Imagizer," is positioned below the slide control 138 in the lower right hand of the pop-up window 128. The selection of the button 142 causes the display of information regarding the version of the Imagizer facility and other related matters. Also, a button 131, entitled "About Indicated Image", is positioned in the upper left most portion of the pop-up window 128. The selection of the button 131 causes the display of related information that is included in metadata associated with an indicated image. For example, the Imagizer facility may display related information that includes an image identification number, author, original date that image of subject matter was captured, location and descriptive title. It is also envisioned that this information may be automatically displayed by the Imagizer facility along with a display of each related image.

Figure 4:
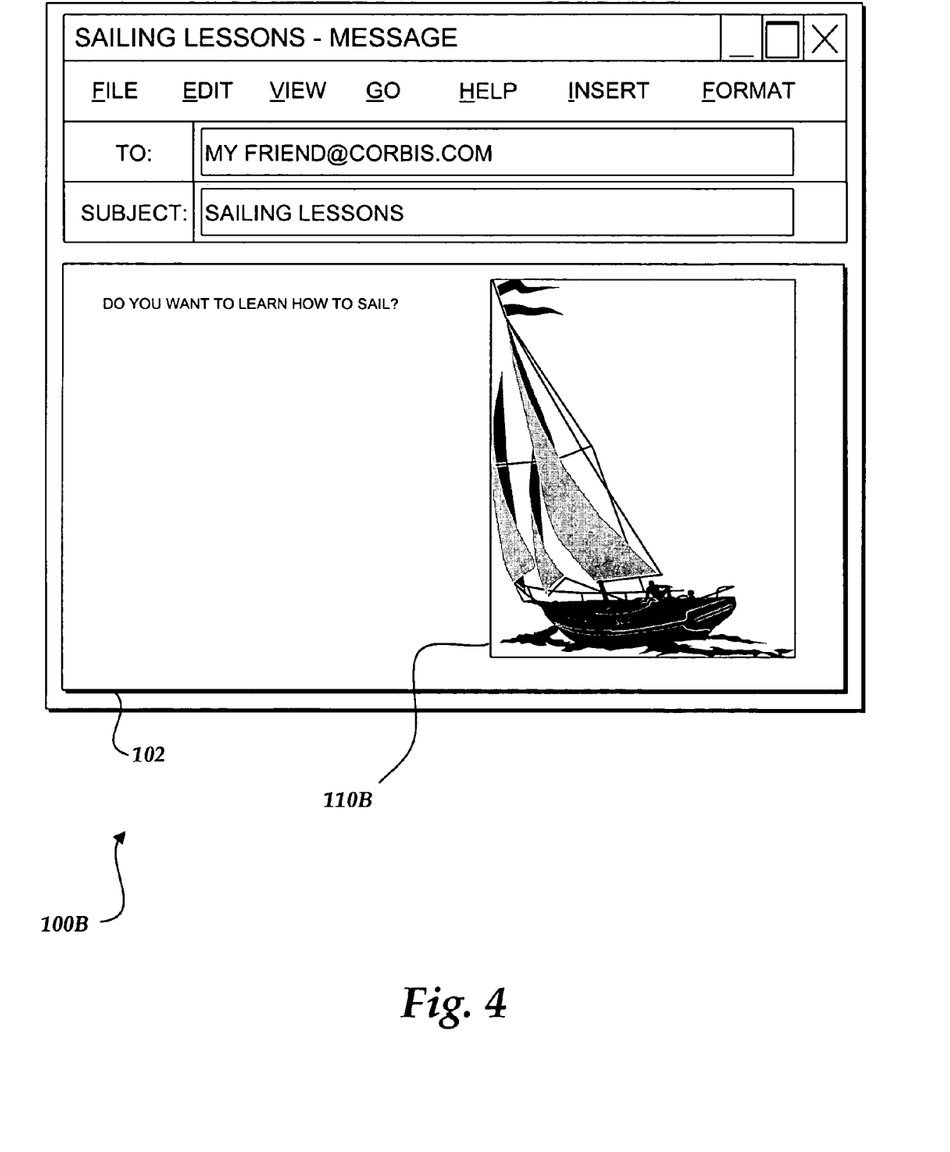
FIG. 4 shows a graphical image disposed in the document displayed in the graphical user interface for the exemplary email program.

FIG. 4 illustrates another exemplary window 100B for the application program that incorporates the Imagizer facility. In the document window 102, a higher quality (version) image 110B of a sail boat is pasted into the open document window adjacent to the word "sail" 106 in the right hand portion of the window. This example shows the results when a higher quality version of a thumbnail image is purchased and pasted into an open document.

Additionally, an embedded link (URL) may be automatically added to a pasted image. When the pasted image is selected, the embedded URL could provide a link to an information page associated with the pasted image on a remotely located server.

Generally, a thumbnail image may have a resolution of 100×100 pixels. However, the higher quality versions of the relatively low resolution thumbnail image can be provided at increasingly greater resolutions for a correspondingly larger cost, e.g., a 256×256 pixel image might be free, a 640×640 pixel image could cost $5.00 and a 1024×1024 pixel image might cost $20.00. It is envisioned that the actual cost of the images could be controlled/changed by a server that enables the Imagizer facility to access a database of images.

Figure 5A:
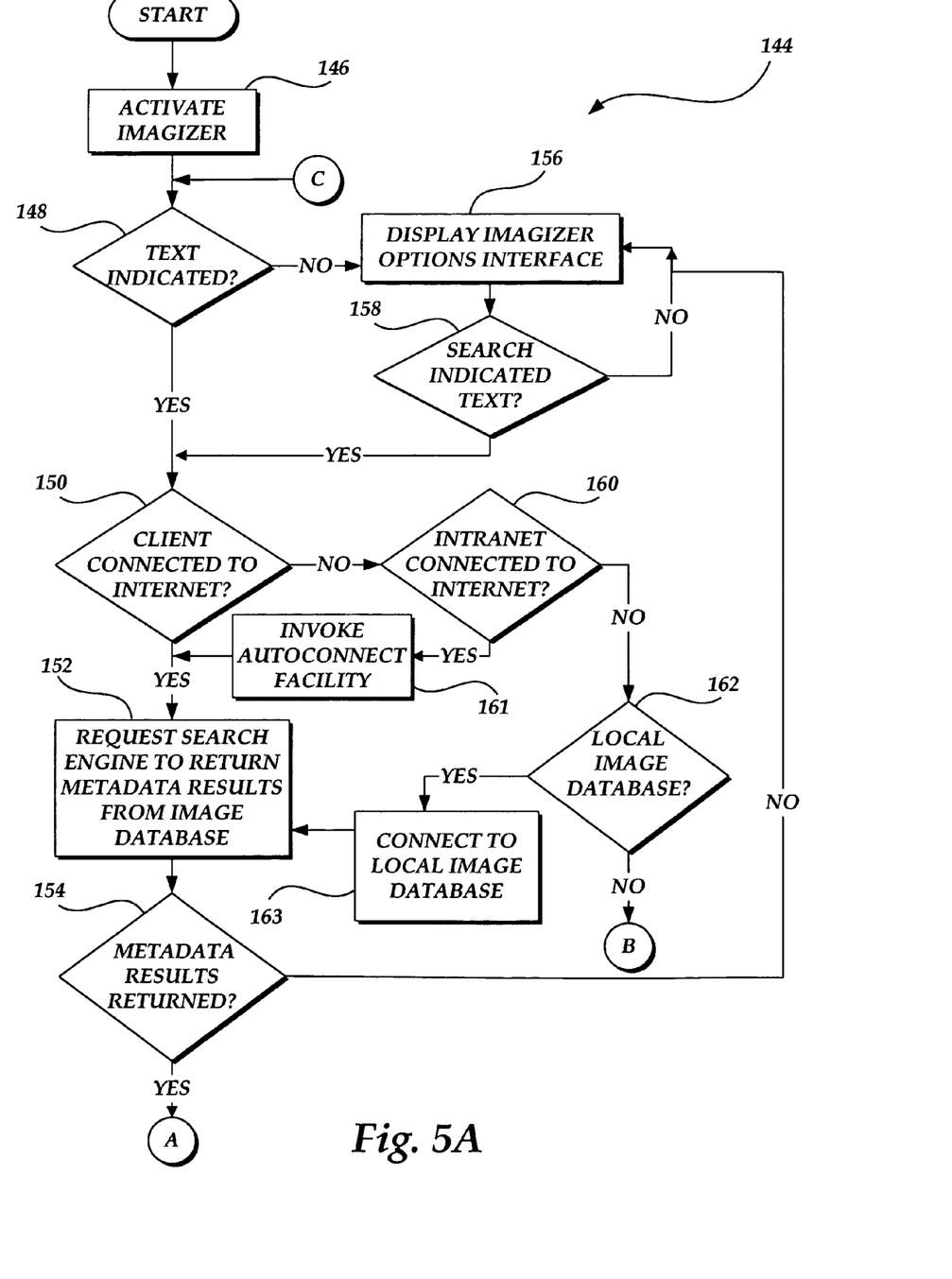
FIGS. 5A–5B illustrate a flowchart of the logic for obtaining an image that is relevant to indicated text.
Figure 5B:
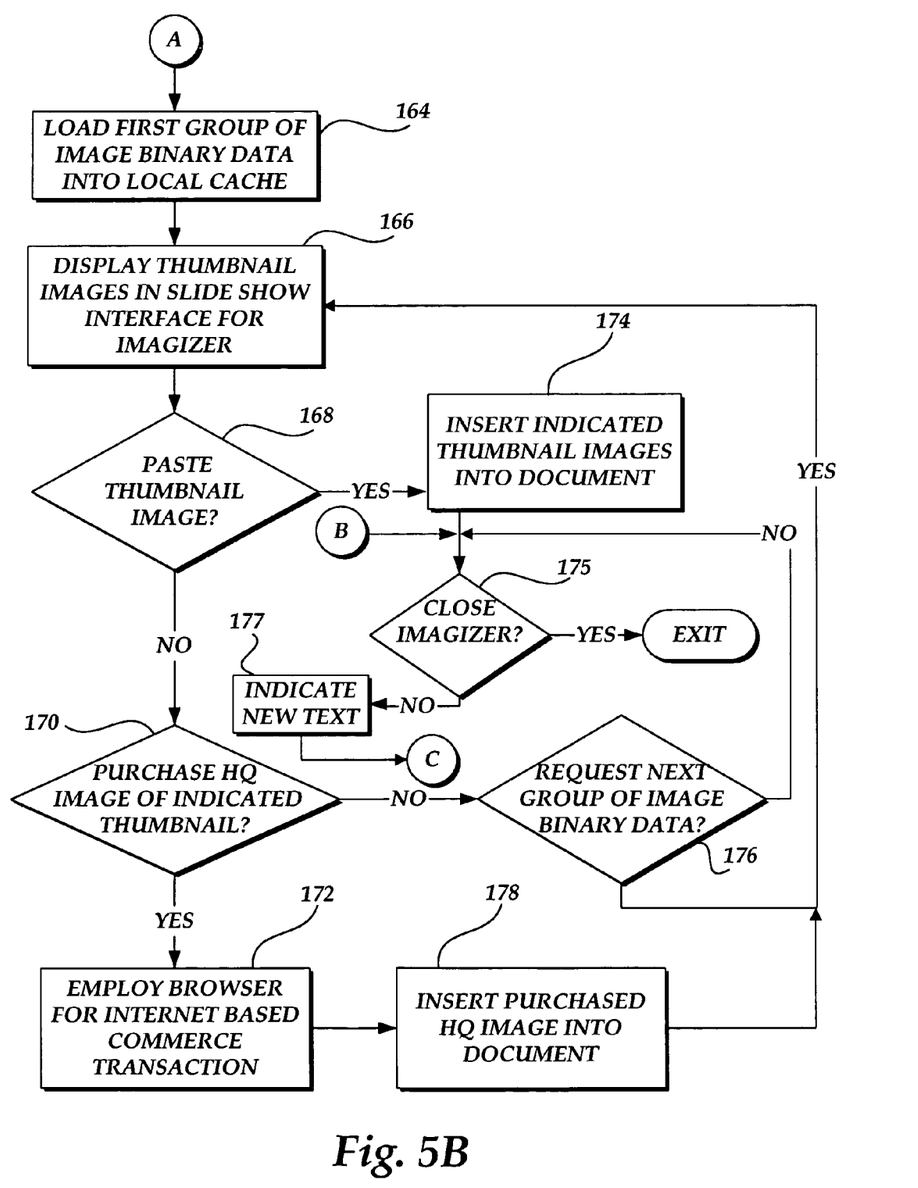

FIGS. 5A and 5B show an overview 144 of the logic performed by the present invention to get, indicate and insert a relevant image into an open document. In FIG. 5A, moving from a start block, the logic steps to a block 146 where the Imagizer facility is activated. In this example, the Imagizer facility is activated from a context menu. However, it is envisioned that the Imagizer facility may also be launched from a pop-up window, drop-down menu, dialogue box and hot key. Additionally, in this example, the Imagizer facility acts as a client providing a query to a search engine server that can search a database for relevant images.

Flowing to a decision block 148, a determination is made whether text is indicated. If false, the logic moves to a block 156 where the "options" pop-up window 128 for the Imagizer facility is displayed as shown in FIG. 3. Advancing to a decision block 158, the logic determines whether indicated text is provided in the text entry box 130 of the options pop-up window 128. If false, the logic loops back to the block 156 until the pop-up window 128 is closed or the indicated text is provided in the text entry box 130. However, when the determination at the decision block 158 is true, the logic will move to a decision block 150. Also, if the determination at the decision block 148 was true, the logic would have moved to the decision block 150. Additionally, the text could be indicated in a separate clipboard program; and although not shown, the history of previously indicated text may be saved and reused as the currently indicated text.

At the decision block 150, a determination is made whether the Imagizer facility can connect directly to the Internet. If false, the logic moves to a decision block 160 where a determination is made whether the Imagizer facility can connect to the Internet through an intranet connection. If the determination at the decision block 160 is false the logic will move to a decision block 162 where a determination is made whether a local server for searching a database of images is available. The Imagizer facility can determine if a local drive contains a database of images that might be relevant to the indicated text. Also, the Imagizer facility may prompt the user to indicate the path to a local image database.

If the determination at the decision block 162 is negative, the logic moves to a decision block 175, as shown in FIG. 5B. However, if the determination at the decision block 162 is affirmative, the logic steps to a block 163 and the Imagizer facility connects with the local image database. The logic advances to a block 152 where the Imagizer facility creates a request (query) for relevant images based on the indicated/entered text. The request is sent to a local search engine server to return metadata results from a data base of images on a local drive, e.g., a hard disk, floppy disk, tape drive, digital versatile disc (DVD) drive and compact disc read only memory (CD-ROM) drive.

Alternatively, when the determination at the decision block 150 is true, the logic moves to the block 152 where the Imagizer facility connects through the Internet to another search engine server that returns metadata results from a remotely located image database. Also, if the determination at the decision block 160 is true, the logic steps to a block 161 where an autoconnect facility is invoked to connect the Imagizer facility to the remotely located image database. The autoconnect facility can determine if a proxy server is available for connecting across the Internet to the remotely located image database. Alternatively, the autoconnect facility may initiate a dial-up telephone connection to an indicated Internet Service Provider (ISP) to create a connection to the remotely located image database. The autoconnect facility may prompt the user to provide a new telephone number for the ISP when a previously provided telephone number is not available.

The logic moves from the block 161 to the block 152 where the Imagizer facility connects with the other search engine server. An important aspect of the present invention is sending a query and receiving results over a network without having to launch a separate application program such as a browser. Additionally, the query may employ an extensible markup language (XML) data structure to communicate over a network with a search engine for searching an image database such as the CORBIS CORPORATION's CORBIS PICTURE EXPERIENCE at http://www.corbis.com.

The logic flows to a decision block 154 and determines if the metadata results from the query were returned. If false, the logic jumps back to the block 156 where substantially the same logic discussed above is repeated. However, if the determination is true, then the logic moves to a block 164 as shown in FIG. 5B and where the first group of binary image data is placed in a local cache managed by the Imagizer facility. Although the metadata results may identify hundreds of relevant images, the present invention provides for downloading one group at a time of the most relevant images for display in a slide show. For this example, the first group downloaded includes fifty of the most relevant thumbnail images as binary image data. However, in another embodiment, the binary image data for all of the relevant images identified by the metadata results could be downloaded for display in the slide show.

The logic steps to a block 166 where the first group of thumbnail images are displayed in the slide show such as illustrated in pop-up window 128 of FIG. 2. Moving to a decision block 168, a determination is made as to whether one of the thumbnail images in the slide show is indicated for inserting (pasting) into the open document. If affirmative, the logic advances to a block 174 where the indicated thumbnail image is pasted into the open document. Next, the logic flows to the decision block 175 where a determination is made whether a user has chosen to close the Imagizer facility. If yes, the logic steps to an exit block and terminates. However, if the determination at the decision block 175 is no, the logic will move to a block 177 where new indicated text is provided. Next, the logic loops back to the decision block 148 where substantially the same logic discussed above is be repeated.

Alternatively, when the determination at the decision block 168 is negative, the logic steps to a decision block 170 where a determination is made as to whether the purchase of a higher quality version of the thumbnail image is indicated. If false, the logic moves to a decision block 176 where a determination is made as to whether a request for the next group of thumbnail images is provided. If negative, the logic moves to the decision block 175 where substantially the same logic discussed above is repeated. However, when the determination at the decision block 176 is positive, the logic returns to the block 166 where the next group of 50 thumbnail images are displayed in a slide show and substantially the same logic discussed above is repeated.

Also, when the determination at the decision block 170 is positive, i.e., the purchase of a higher quality image is indicated, the logic moves to a block 172 where a browser program is launched to connect to an Internet based web site for performing an electronic financial transaction service that enables the purchase of a higher quality version of the indicated thumbnail image. The logic flows to a block 178 where the purchased higher quality image is inserted into the open document. Next, the logic advances to the block 166 where the same group of images are displayed in the slide show and substantially the same logic discussed above is repeated.

Although not shown, different parameters of the higher quality image may be chosen such as resolution and color. Also, the use of the higher quality image may be identified, e.g., personal, work and publication. The chosen parameters and use may be employed to determine the cost of purchasing the higher quality version of the indicated thumbnail image.

Figure 6:
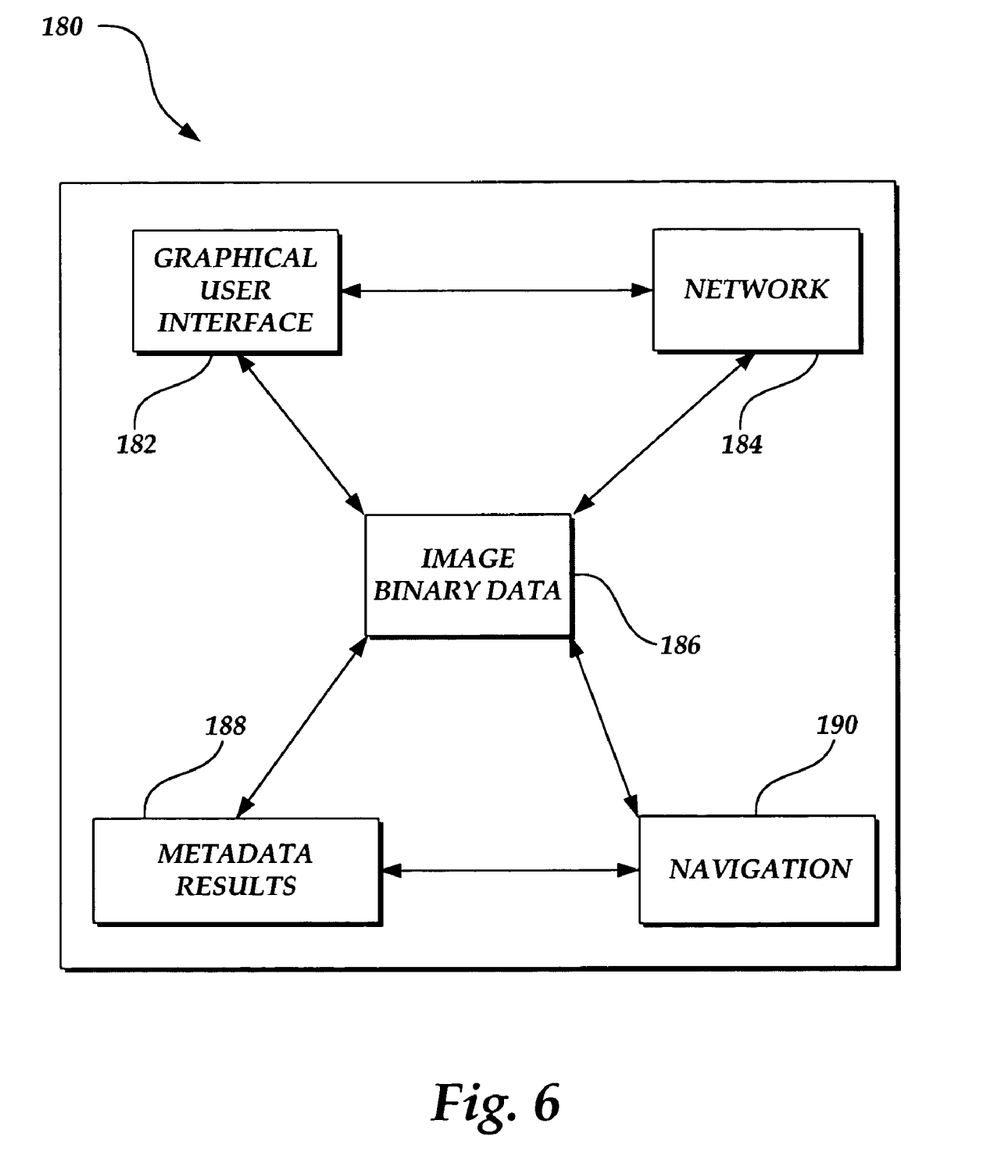
FIG. 6 shows a schematic overview of a client program that includes five separate components for performing functions related to obtaining images that are relevant to the indicated text.

FIG. 6 illustrates five integrated components that may be employed by an Imagizer facility 180 to get, view and use an indicated image. A graphical user interface component 182 provides for automatically creating search criteria for a query from the indicated text and inserting a thumbnail or higher quality image into an open document. A metadata results component 188 provides for managing the storing, parsing and displaying of the metadata results returned from a query of the database of images. A navigation component 190 provides for managing user interface navigation elements used to control the display of the results (thumbnail images) of the query, e.g., play, stop, back and next controls. An image binary data component 186 provides for managing the display of returned images and managing the storage of the binary image data for the thumbnail and higher quality images. Also, a network component 184 provides for detecting the presence of a network and its settings and managing the transfer of data across the network such as the Internet and an intranet. The network component may employ a transmission device to automatically connect to the search engine for the database, e.g., a cable modem, network interface card, telephony modem, satellite dish and radio transceiver.

In one embodiment, the network component 184 may launch a separate browser program to manage the transfer of data over a network. In another embodiment, the network component 184 will manage the data transfer from within the Imagizer facility without having to launch the browser program. The network component 184 could send the query to a remotely located search engine, obtain the result of the query and download thumbnail images indicated by the query result. In yet another embodiment, a browser program could be launched by the network component 184 for managing the transfer of financial data to purchase of a higher quality version of an indicated thumbnail image from an electronic commerce server. In still another embodiment, the network component may manage the transfer of financial data to purchase a higher quality image without having to launch the browser program.

Figure 7:
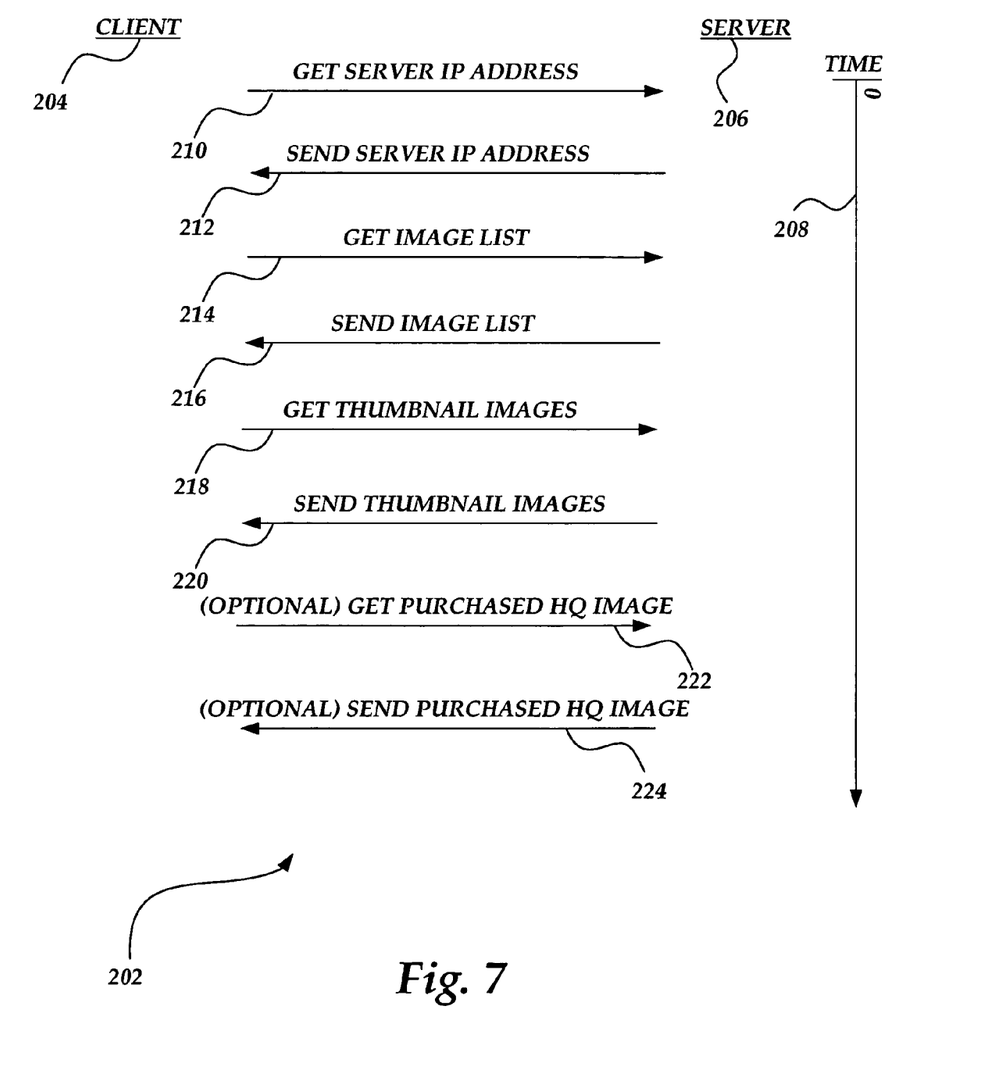
FIG. 7 illustrates a schematic overview of communication between the client program and a server program for obtaining images that are relevant to the indicated text.

FIG. 7 shows a graphical representation of an overview 202 of how data packets (information) are communicated between the Imagizer facility acting as a client 204 and a search engine acting as a server 206 that receives the client's query and returns results, e.g., metadata, from a database of images. A time line 208 is positioned vertically adjacent to a graphical representation of an exchange of requests and responses between the client 180 and the server 206. Moving down the time line 208 from the top of the figure and an initial time value of "zero," the client 204 provides a "Get server ip address" request 210 to the server 206. In reply, the server 206 sends a "Server ip address" response 212 to the client 204. Next, the client 204 communicates a "Get image list" request 214 to the server 206. This request includes a query based on the indicated text. Advancing down the time line 208, the server 206 communicates a "Send image list" response 216 to the client 204 which includes metadata results indicating a list of the images that are determined to be relevant to the indicated text.

A "Get thumbnail images" request 218 is communicated by the client 204 to the server 206 indicating a particular group of thumbnail images. The server 206 provides a "Send thumbnail images" response 220 to the client 204 which includes the binary image data for the requested group of thumbnail images. Optionally, when the client 204 has requested a purchase of a higher quality image, a "Get Purchased HQ Image" request 222 will be provided by the client to the server. In reply, the server 206 will provide a "Send Purchased HQ Image" response 224 to the client 204 that includes the binary image data for the purchased higher quality image.

Figure 8:
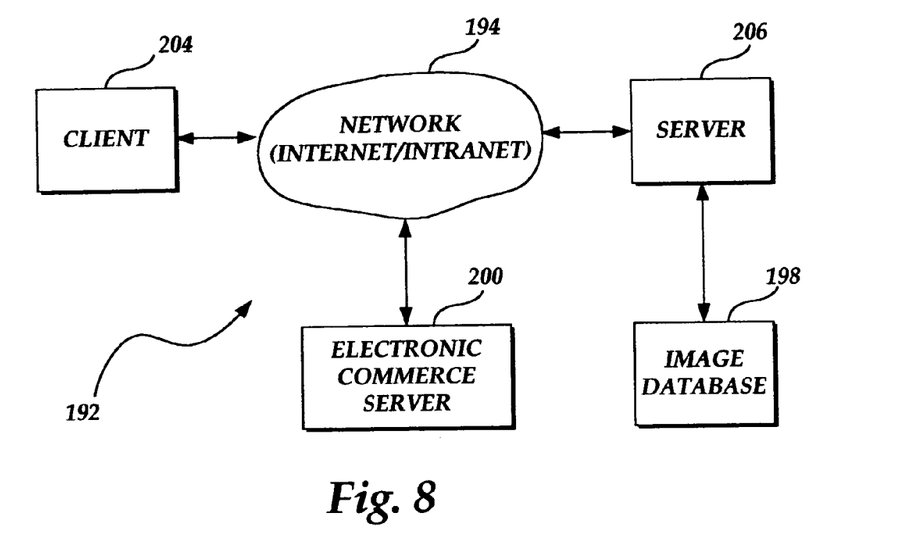
FIG. 8 shows an exemplary computer system for implementing the client program.

FIG. 8 illustrates a schematic overview 192 of a client-server architecture for implementing the present invention. The client 204, server 206 and an electronic commerce server 200 are in communication with each other over a network 198 such as an intranet and the Internet. The server 206 is also in communication with a database 198 that may be searched for images relevant to a query related to indicated text provided by the client 204. Additionally, it is envisioned that different types of transport protocols may be employed to communicate between the client 204, server 206, and electronic commerce server 208, including hyper text transport protocol (HTTP), file transfer protocol (FTP) and transmission control protocol/internet protocol (TCP/IP).

The electronic commerce server 200 provides a service that enables the conduct of commerce in goods and services, with the assistance of telecommunications and telecommunications-based tools. The client 204 may provide a credit card number to the electronic commerce server 200 to purchase a higher quality (resolution) version of an indicated thumbnail image which is retrieved from the database 198 by the server 206 and downloaded to the client. The electronic commerce server 200 may employ a digital signature and public/private key based encryption to complete the financial transaction.

Figure 9:
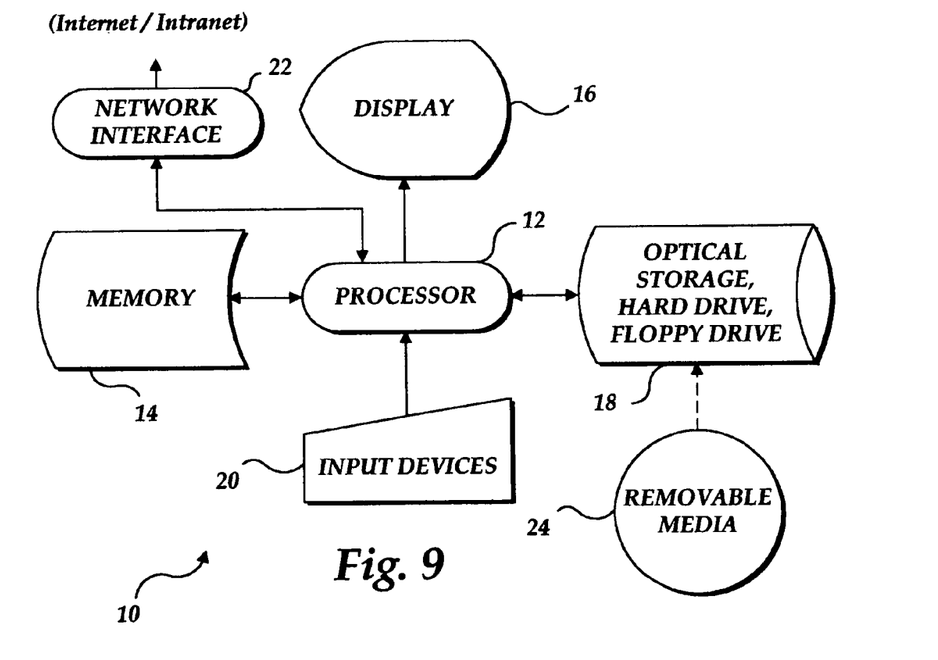
FIG. 9 is a schematic overview illustrating the system architecture for implementing the present invention over the Internet.

FIG. 9 illustrates a system 10 comprising components of a computer suitable for executing a client program embodying the present invention. A processor 12 is coupled bi-directionally to a memory 14 that encompasses read only memory (ROM) and random access memory (RAM). ROM is typically used for storing processor specific machine code necessary to bootup the computer comprising client 10, to enable input and output functions, and to carry out other basic aspects of its operation. Prior to running any application program, the machine language code comprising the program is loaded into RAM within memory 14 and then executed by processor 12. Processor 12 is coupled to a display 16 on which the visualization of the HTML response discussed above is presented to a user. Often, programs and data are retained in a nonvolatile memory media that may be accessed by a compact disk-read only memory (CD-ROM) drive, compact disk-read/write memory (CD-R/W) drive, optical drive, digital versatile disc (DVD) drive, hard drive, tape drive and floppy disk drive, all generally indicated by reference numeral 18 in FIG. 9. A network interface 22 couples the processor 12 to a wide area network such as the Internet.

As noted above, the present invention can be distributed for use on the computer system 10 as machine instructions stored on a memory media such as a floppy disk 24 that is read by the floppy disk drive. The program would then typically be stored on the hard drive so that when the user elects to execute the application program to carry out the present invention, the machine instructions can readily be loaded into memory 14. Control of the computer and selection of options and input of data are implemented using input devices 20, which typically comprise a keyboard and a pointing device such as a mouse (neither separately shown). Further details of the system 10 and of the computer comprising it are not illustrated, since they are generally well known to those of ordinary skill in the art. Additionally, although not shown, a computer system for the server 206 could be configured in substantially the same way as the computer system 10 illustrated here, albeit different in other ways.

In one embodiment, an electronic shopping cart may be used for the temporary storage of a potential purchase of a higher quality version of at least one indicated thumbnail image. An electronic shopping cart is an application program that enables on-line image selection and ordering processes. Typically, an electronic shopping cart is part of the interface between an Internet web site and its deeper infrastructure, e.g., an image database, allowing users to select merchandise; review what they have selected; make necessary modifications or additions; and purchase the selected merchandise. It is envisioned that the electronic shopping cart would temporarily hold a higher quality image until the purchase could be completed at a later date when final purchasing decisions are made and/or sufficient funds become available.

In another embodiment, the present invention may employ a separate qualification engine to assist in the creation of the query for the search engine to locate relevant images in an image database. It is envisioned that the qualification engine may determine the context of the indicated text, e.g., the qualification engine may examine the context of the indicated text within a sentence, paragraph, or entire document. Also, the qualification engine may employ the content of other images in the document and user preferences to help create the query.

In one embodiment, a digital watermark may be included with each image. A digital watermark is a represented by a pattern of bits inserted into a file for an image. The digital watermark may be designed to be completely invisible or visible and the actual bits representing the watermark tend to be scattered throughout the file in such a way that they cannot be identified and manipulated. The digital watermark can withstand normal changes to the file, such as reductions from lossy compression algorithms. It is envisioned that a digital watermark may be employed to identify copyright information and provide information related to the content of the image.

In yet another embodiment, a cookie identifying user preferences may be included with the query that is sent to the search engine. The search engine could use the cookie information to help provide metadata results that are related to the user preferences. Also, the cookie information may provide a user-specific set of results, such as a list of images that were previously pasted into documents, a history of previously ordered/purchased images, and a user-organized collection of images, e.g., a portfolio.

In yet another embodiment, the present invention may be employed to automatically generate a query for an indicated object and return results from a search engine that identifies any object that is related to the indicated object. The indicated object and the related object may include different types of data comprising text, pictures, video, and sound. For example, an indicated text object could be used by the present invention to cause a search engine to return different related objects that include text, video and sound (audio).

While the preferred embodiment of the invention has been illustrated and described, it will be appreciated that various changes can be made therein without departing from the spirit and scope of the invention.

What is claimed is:

1. A method for searching a database to obtain an object that is related to an indicated object in a document, comprising:
    automatically creating a query directly from the indicated object, the query having a data structure that is recognizable by a local search engine and a remote search engine, wherein the query is created by:
        enabling a sentence comprising a plurality of words to be input into the document,
        repositioning a cursor nearest to any one of the words in the sentence other than a last word input into the document, wherein the cursor is capable of being repositioned nearest to any one of the words after the sentence is entered into the document, and
        after repositioning the cursor, automatically selecting the nearest word to the cursor in the sentence as the indicated object without having a user to make a selection for the query in a separate document;
    if the remote search engine is accessible, providing the query over a network to the remote search engine to search a remote database for at least one object that is related to the indicated object, and if the remote search engine is inaccessible, providing the query to the local search engine to search a local database for at least one object that is related to the indicated object;
    returning a result from the query, the result indicating when at least one object is related to the indicated object; and
    producing a display of one of the related objects, so that at least one of the related objects may be associated with the indicated object.

2. The method of claim 1, wherein the indicated object and the related object include data, the data comprising video, picture, sound, and text.

3. The method of claim 1, further comprising:
    enabling a qualification engine to determine a context of the indicated object; and
    employing the context of the indicated object to automatically create the query for the database.

4. The method of claim 1, wherein producing a display of a related object further comprises displaying one of the related objects from a plurality of related objects using a slide show mechanism rather than displaying the plurality of related objects, the plurality of related objects being indicated in the result from the query.

5. The method of claim 1, further comprising:
indicating the at least one related object that is to be purchased over the network;
providing financial information to an electronic commerce service over the network, the electronic commerce service enabling the purchase of the at least one related object when the financial information is complete; and
inserting the at least one purchased object into the document so that the indicated object is displayed with the indicated text.

6. A method for obtaining an image from a database for insertion into a document, the image being related to an indicated text, comprising:
enabling an automatic creation of a query directly from the indicated text, the query having a data structure that is recognizable by a local search engine and a remote search engine, wherein the indicated text comprises an automatic selection of a nearest word to a cursor when no indicated text is provided, and the query is created without having the user make a selection for the query in a separate document;
if the remote search engine is accessible, providing the query over a network to the remote search engine to search a remote database for an image that is related to the indicated text, and if the remote search engine is inaccessible, providing the query to the local search engine to search a local database for an image that is related to the indicated text;
returning a result from the query of the database, the result indicating when at least one image is related to the indicated text;
enabling the display of at lest one image indicated by the result from the query, a displayed image being selectable for insertion into the document; and
displaying a related image that is inserted into the document, so that the related image is associated with the indicated text in the document;
wherein the automatic selection of a nearest word further comprises:
enabling a sentence comprising a plurality of words to be input into the document;
repositioning a cursor nearest to any one of the words in the sentence other than a last word input into the document, wherein the cursor is capable of being repositioned nearest to any one of the words after the sentence is entered into the document; and
after repositioning the cursor, automatically selecting the nearest word to the cursor in the sentence as the indicated object.

7. The method of claim 6, further comprising employing a user interface component to automatically create the query for the database, the creation of the query being related to the indicated text.

8. The method of claim 7, wherein the user interface component enables the indicated text to be edited.

9. The method of claim 7, wherein the user interface component enables the indicated text to be chosen in the document.

10. The method of claim 9, further comprising choosing the indicated text in the document for the query of the database from within an application program that provides the document.

11. The method of claim 10, further comprising choosing a command to create the query for the indicated text, the command including an indication in a context menu, drop-down menu, pop-up window, dialogue box, toolbar and hot key.

12. The method of claim 9, further comprising choosing the indicated text in the document for the query of the database from an application program that is separate from another application program that provides the document.

13. The method of claim 7, further comprising:
enabling a qualification engine to determine a context of the indicated text within the document; and
providing the context of the indicated text to the user interface component, the user interface component employing the context of the indicated text to automatically create the query for the database.

14. The method of claim 13, wherein the determined context of the indicated text includes text, template, sound, video, picture, use and user preference.

15. The method of claim 6, further comprising enabling the indicated text to be chosen in another application program that does not provide the document, including a clipboard program.

16. The method of claim 6, wherein the local search engine employing the query to search for related images on a local drive that includes the database.

17. The method of claim 16, wherein the local drive includes hard disk, floppy disk, tape drive, DVD and CD-ROM.

18. The method of claim 6, wherein the query's data structure includes XML.

19. The method of claim 6, further comprising employing a network component to communicate with the remote search engine over a network, the network including an intranet and the Internet.

20. The method of claim 6, further comprising employing a result component to manage the result of the query returned by the search engine, the result component enabling the parsing, storing and display of the result of the query.

21. The method of claim 6, wherein the result is in a metadata format.

22. The method of claim 6, further comprising requesting at least one related image from the database that is indicated by the result of the query, the related image being provided as binary image data.

23. The method of claim 22, further comprising employing an image component for managing the storage and display of binary image data.

24. The method of claim 22, further comprising employing a navigation component to provide at least one control for displaying at least one related image.

25. The method of claim 22, wherein a navigation component enables the display of a group of related images in a slide show, the group of related images being indicated in the result from the query.

26. The method of claim 25, wherein the navigation component enables another group of related images to be displayed in the slide show, the other group of related images being indicated in the result from the query.

27. The method of claim 26, wherein the navigation component includes a control for, indicating each group of related images that are currently displayed in the slide show.

28. The method of claim 25, wherein the navigation component includes a control for determining a period of time that each related image is displayed in the slide show.

29. The method of claim 25, wherein the navigation component includes a control for indicating the number of the related images in the group that is currently displayed in the slide show.

30. The method of claim 6, further comprising enabling a help facility to provide an explanation of a chosen topic and the help facility being launched in response to an input.

31. The method of claim 6, wherein the display of at least one related image further comprises displaying a thumbnail of the related image.

32. The method of claim 6, further comprises including a digital watermark with the related image, the digital watermark including information related to the content of the related image.

33. The method of claim 6, further comprises including a cookie with the query, the cookie including information related to a user.

34. The method of claim 6, further comprising:
  indicating a higher quality image of the related image is to be purchased
  providing financial information to an electronic commerce service over the network, the electronic commerce service enabling the purchase of the higher quality image when the financial information is complete; and
  inserting the purchased higher quality image into the document so that the higher quality image is displayed with the indicated text.

35. The method of claim 34, further comprising employing an electronic shopping cart to store a potential purchase of the higher quality image.

36. The method of claim 34, further comprising enabling a parameter of the higher quality image to be indicated.

37. The method of claim 34, further comprising enabling a use of the higher quality image to be indicated.

38. The method of claim 6, further comprising:
  each time indicated text is employed to create the query, automatically saving the indicated text as an entry in a history file; and
  enabling at least one of the entries in the history file to be chosen for the currently indicated text.

39. The method of claim 6, further comprising embedding a URL with the related image pasted into the document, the URL providing a link to information associated with the related image.

40. The method of claim 19, wherein the network component employs a transmission device to automatically connect to the search engine for the database, the transmission device including cable modem, network interface card, telephony modem, satellite dish and radio transceiver.

41. The method of claim 19, further comprising employing the network component to automatically connect to the search engine for the database when the search engine is remotely located from the indicated text.

42. The method of claim 19, wherein the network component employs a proxy server to automatically connect to the search engine for the database.

43. The method of claim 19, wherein the network component employs a dial up facility to automatically connect to the search engine for the database.

44. The method of claim 19, wherein the network component launches a browser to automatically connect to the search engine for the database.

45. The method of claim 19, wherein the network component automatically connects to the search engine.

46. The method of claim 19, wherein the network component launches a browser to manage a purchase of a higher quality image associated with the related image.

47. The method of claim 19, wherein the network component manages a purchase of a higher quality image associated with the related image.

48. A system for obtaining an image from a database for pasting into a document, the image being related to indicated text, comprising:
  (a) a client process for causing functions to be performed, including:
    (i) enabling an automatic creation of a query directly from the indicated text, the query having a data structure that is recognizable by a local search engine and a remote search engine, wherein the indicated text comprise an automatic selection of a nearest word to a cursor and the query is create without having the user make a selection for the query in a separate document;
    (ii) if the remote search engine is accessible, providing the query over a network to the remote search engine to search a remote database, and if the remote search engine is inaccessible, providing the query to the local search engine to search a local database for an image that is related to the indicated text;
    (iii) enabling a display of at least one related image indicated by the a result from the query, the display of a related image being selectable for insertion into the document; and
    (iv) displaying the related image that is inserted into the document, the related image being associated with the indicated text in the document; and
  (b) a server process for causing functions to be performed, including:
    (i) returning the result from the query of the remote database, the result indicating when at least one image is related to the indicated text; and
    (ii) enabling the remote search engine to locate at least one image in the remote database that is related to the indicated text;
  wherein the automatic selection of the nearest word is achieved by enabling a sentence comprising a plurality of words to be input into the document, repositioning the cursor nearest to any of the words in the sentence other than a last word input into the document, wherein the cursor is capable of being repositioned nearest to any one of the words after the sentence is entered into the document, and after repositioning the cursor, automatically selecting the nearest word to the cursor in the sentence as the indicated text.

49. The system of claim 48, wherein the client process causes further functions to be performed, comprising:
  (c) indicating a higher quality image of the related image is to be purchased over a network;
  (d) providing financial information to an electronic commerce service over the network, the electronic commerce service enabling the purchase of the higher quality image when the financial information is complete; and
  (e) inserting the purchased higher quality image into the document so that the higher quality image is displayed with the indicated text.

50. A computer readable medium having computer-executable components, comprising:
  a component for automatically creating a query directly from indicated text, the query having a data structure that is recognizable by a local search engine and a remote search engine, wherein the indicated text comprises an automatic selection of a nearest word to a cursor, and wherein the query is created without having the user make a selection for the query in a separate document;

a component for providing the query over a network to the remote search engine that searches a remote database for an image that is related to the indicated text if the remote search engine is accessible, and to the local search engine that searches a local database for an image that is related to the indicated text if the remote search engine is inaccessible;

a component for returning a result from the query, the result indicating when at least one image is related to the indicated text;

a component for enabling the a display of at least one related image indicated by the result from the query, the display of the related image being selectable for insertion into the document; and a component for displaying the related image that is inserted into the document, so that related image is associated with the indicated text in the document;

wherein the automatic selection of the nearest word is achieved by enabling a sentence comprising a plurality of words to be input into the document, enabling a repositioning of the cursor nearest to any one of the words in the sentence other than a last word input into the document, wherein the cursor is capable of being repositioned nearest to any one of the words after the sentence is entered into the document, and after repositioning the cursor, automatically selecting the nearest word to the cursor in the sentence as the indicated text.

51. A method for electronically purchasing an image over a network, comprising:

(a) automatically creating a query related to an indicated object, the query having a data structure that is recognizable by a local search engine and a remote search engine, wherein the query is created by automatically selecting a nearest word to a cursor as the indicated object without having a user make a selection for the query in a separate document;

(b) if the remote search engine is accessible, providing the query over a network to the remote search engine to search a remote database for at least one image that is related to the indicated object, and if the remote search engine is inaccessible, providing the query to the local search engine to search a local database for at least one image that is related to the indicated object;

(c) returning a result from the query of the database, the result indicating when at least one image is related to the indicated object;

(d) indicating a related image is to be purchased over the network, financial information being provided to an electronic commerce service that enables the purchase of the related image when the financial information is complete; and (e) when the related image is purchased, inserting of the related image into a document, so that the related image may be associated with the indicated object;

wherein automatically selecting of the nearest word further comprises: enabling a sentence comprising a plurality of words to be input into a document, enabling a repositioning of the cursor nearest to any one of the words in the sentence other than a last word input into the document, wherein the cursor is capable of being repositioned nearest to any one of the words after the sentence is entered into the document, and after repositioning the cursor, automatically selecting the nearest word to the cursor in the sentence as the indicated object.

52. The method of claim 51, wherein the indicated object includes data, comprising video, picture, sound, and text.

53. The method of claim 51, further comprising:

(f) enabling a qualification engine to determine a context of the indicated object; and (g) employing the context of the indicated object to automatically create the query for the database.

* * * * *

UNITED STATES PATENT AND TRADEMARK OFFICE
CERTIFICATE OF CORRECTION

PATENT NO.         : 7,051,019 B1  
APPLICATION NO. : 09/376748  
DATED                 : May 23, 2006  
INVENTOR(S)        : Stephen D. Land et al.

Page 1 of 1

It is certified that error appears in the above-identified patent and that said Letters Patent is hereby corrected as shown below:

Column 4, Line 29, Delete "EMBODIMENT" and insert -- EMBODIMENTS --.

Column 5, Line 3, After "and" delete "imagizer." And insert --Imagizer.--.

Column 5, Line 3, After "an" delete "imagizer" and insert --Imagizer--.

Column 5, Line 5, Delete "imagizer" and insert -- Imagizer--.

Column 5, Line 7, Delete "imagizer" and insert -- Imagizer --.

Column 5, Line 57, "("Next>")" and insert -- ("Next>>") --.

Column 13, Line 35, In Claim 6, after "at" delete "lest" and insert --least--.

Column 14, Line, 59, In Claim 27, after "for" delete ",".

Column 16, Line 21, In Claim 48, after "the" delete "a".

Column 17, Line 11, In Claim 50, after "the" delete "a".

Column 18, Line 15, In Claim 50, after "inserting" delete "of".

Signed and Sealed this

Twenty-eighth Day of November, 2006

JON W. DUDAS  
*Director of the United States Patent and Trademark Office*